(12) United States Patent
Yokoyama

(10) Patent No.: US 10,516,159 B2
(45) Date of Patent: Dec. 24, 2019

(54) POSITIVE ELECTRODE ACTIVE MATERIAL FOR NONAQUEOUS SECONDARY BATTERY

(71) Applicant: Nichia Corporation, Anan-shi, Tokushima (JP)

(72) Inventor: Tatsuya Yokoyama, Tokushima (JP)

(73) Assignee: NICHIA CORPORATION, Anan-Shi (JP)

(\*) Notice: Subject to any disclaimer, the term of this patent is extended or adjusted under 35 U.S.C. 154(b) by 75 days.

(21) Appl. No.: 14/723,306

(22) Filed: May 27, 2015

(65) Prior Publication Data

US 2015/0349336 A1 Dec. 3, 2015

(30) Foreign Application Priority Data

May 28, 2014 (JP) ................. 2014-110241
Apr. 10, 2015 (JP) ................. 2015-081025

(51) Int. Cl.
*H01M 4/36* (2006.01)
*H01M 4/131* (2010.01)
*H01M 4/525* (2010.01)
*H01M 4/505* (2010.01)
*H01M 4/485* (2010.01)
*H01M 4/02* (2006.01)

(52) U.S. Cl.
CPC .......... *H01M 4/366* (2013.01); *H01M 4/131* (2013.01); *H01M 4/485* (2013.01); *H01M 4/505* (2013.01); *H01M 4/525* (2013.01); *H01M 2004/028* (2013.01); *Y02E 60/122* (2013.01)

(58) Field of Classification Search
CPC ...... H01M 4/366; H01M 4/131; H01M 4/525; H01M 4/485; H01M 2004/028; H01M 4/505; Y02E 60/122
USPC ...................................... 429/223; 252/182.1
See application file for complete search history.

(56) References Cited

U.S. PATENT DOCUMENTS

| | | | |
|---|---|---|---|
| 6,337,132 B1 | 1/2002 | Kajiyama et al. | |
| 2006/0134520 A1* | 6/2006 | Ishii | H01M 2/1673 429/223 |
| 2007/0207384 A1* | 9/2007 | Nakura | H01M 4/131 429/231.1 |
| 2008/0233477 A1 | 9/2008 | Takahashi et al. | |
| 2008/0268340 A1 | 10/2008 | Tatsuyuki et al. | |
| 2012/0321948 A1* | 12/2012 | Oya | H01M 4/0404 429/211 |
| 2013/0224608 A1 | 8/2013 | Sasaki et al. | |
| 2014/0287327 A1 | 9/2014 | Lee et al. | |
| 2015/0180025 A1* | 6/2015 | Mitsumoto | H01M 4/505 429/223 |

FOREIGN PATENT DOCUMENTS

| | | | |
|---|---|---|---|
| JP | H06-111820 A | 4/1994 | |
| JP | H08-111243 A | 4/1996 | |
| JP | H11-224664 | 8/1999 | |
| JP | 2000-281354 A | 10/2000 | |
| JP | 2001-006683 A | 1/2001 | |
| JP | 2002-075367 A | 3/2002 | |
| JP | 2003-017054 A | 1/2003 | |
| JP | 2006-012433 A | 1/2006 | |
| JP | 2008-235090 A | 10/2008 | |
| JP | 2008-277087 A | 11/2008 | |
| JP | 2011-146390 A | 7/2011 | |
| JP | 2012-174569 A | 9/2012 | |
| JP | 2014-170656 A | 9/2014 | |
| WO | WO-2011/105126 A1 | 9/2011 | |
| WO | 2013/133572 A | 9/2013 | |
| WO | WO 2014010730 | * 1/2014 | ........... H01M 4/525 |
| WO | 2012/081348 A | 5/2014 | |

\* cited by examiner

*Primary Examiner* — Jonathan G Jelsma
*Assistant Examiner* — Omar M Kekia
(74) *Attorney, Agent, or Firm* — Foley & Lardner LLP

(57) ABSTRACT

The present invention provides a positive electrode active material for a non-aqueous secondary battery including: core particles including, as a main component, a lithium metal composite oxide represented by the following formula: $Li_xNi_yM^1_{1-y-z}M^2_zO_2$ in which $0.90 \leq x \leq 1.50$, $0.6 \leq y \leq 1.0$, $0 \leq z \leq 0.02$, $M^1$ represents at least one element selected from Co, Mn and Al, and $M^2$ represents at least one element selected from the group consisting of Zr, Ti, Mg, B and W, and containing a water-soluble lithium compound in a content of 1.0% or less in terms of a mass ratio; and a surface-treated portion obtained by treating the core particles with a coupling agent.

16 Claims, No Drawings

POSITIVE ELECTRODE ACTIVE MATERIAL FOR NONAQUEOUS SECONDARY BATTERY

CROSS-REFERENCE TO RELATED APPLICATIONS

This application claims priority to Japanese Patent Application No. 2014-110241 filed on May 28, 2014 and Japanese Patent Application No. 2015-081025, filed on Apr. 10, 2015. The entire disclosures of Japanese Patent Application No. 2014-110241 and No. 2015-081025 are hereby incorporated herein by reference.

BACKGROUND OF THE INVENTION

Field of the Invention

The present disclosure relates to a positive electrode active material for a non-aqueous secondary battery, such as a lithium-ion secondary battery.

Description of the Related Art

In recent years, mobile electric devices, such as a VTR, a cell phone, and a laptop personal computer, have spread and are miniaturized, and, as a power source for such mobile devices, non-aqueous secondary batteries, such as lithium-ion secondary batteries, are being used. Further, recently, environmental problems must be dealt with and therefore, the non-aqueous secondary batteries are attracting attention as a power battery for, e.g., an electric vehicle.

As an example of a positive electrode active material for the lithium-ion secondary battery, a lithium-cobalt composite oxide having a layer structure has been practically used. However, the lithium-cobalt composite oxide uses cobalt which is a rare resource, and hence is disadvantageous from the viewpoint of the cost. In view of this, a lithium-nickel composite oxide having a layer structure using nickel instead of cobalt is studied. The lithium-nickel composite oxide has a large charge-discharge capacity per unit mass, as compared to the lithium-cobalt composite oxide; however, the lithium-nickel composite oxide has a problem in that, for example, synthesis of this oxide is difficult. Therefore, the lithium-nickel composite oxide having part of the nickel replaced by another metal element is frequently used.

Meanwhile, there is a technique for treating the surface of lithium metal composite oxide particles with a coupling agent.

For the purpose of suppressing the deterioration of cycle characteristics and others due to moisture adsorption, JP 2000-281354A discloses a technique for treating the surface of lithium metal composite oxide particles, such as $Li_{1.03}Ni_{0.8}Co_{0.2}O_2$, with a coupling agent, such as isopropyltriisostearoyl titanate.

On the other hand, there is also a technique for washing a lithium metal composite oxide, such as a lithium-nickel composite oxide, according to the purpose.

For the purpose of suppressing a lowering of the high rate discharge capacity of a non-aqueous battery using $LiNiO_2$ as a positive electrode active material, JP H06-111820A discloses the reduction of the content of lithium-containing water-soluble impurities in the positive electrode active material to a predetermined content or lower, and a technique for washing with water or an acid the $LiNiO_2$ having such a reduced impurity content which is obtained through heating treatment.

SUMMARY OF THE INVENTION

A positive electrode active material for a non-aqueous secondary battery including:

core particles including, as a main component, a lithium metal composite oxide represented by the following formula and containing a water-soluble lithium compound in a content of 1.0% or less in terms of a mass ratio; and a surface-treated portion obtained by treating the core particles with a coupling agent.

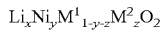

$$Li_xNi_yM^1{}_{1-y-z}M^2{}_zO_2$$

In the formula, x, y and z satisfy $0.90 \leq x \leq 1.50$, $0.6 \leq y \leq 1.0$, $0 \leq z \leq 0.02$, $M^1$ represents at least one element selected from Co, Mn and Al, and $M^2$ represents at least one element selected from the group consisting of Zr, Ti, Mg, B and W.

The positive electrode active material for a non-aqueous secondary battery can maintain the moisture resistance for a long term.

A method for producing a positive electrode active material for a non-aqueous secondary battery, the method including:

a washing step of washing initial particles including, as a main component, a lithium metal composite oxide represented by the following formula to obtain core particles including the lithium metal composite oxide as a main component and containing a water-soluble lithium compound in a content of 1.0% or less in terms of a mass ratio; and a surface treatment step of treating the core particles with a coupling agent.

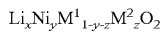

$$Li_xNi_yM^1{}_{1-y-z}M^2{}_zO_2$$

In the formula, x, y and z satisfy $0.90 \leq x \leq 1.50$, $0.6 \leq y \leq 1.0$ and $0 \leq z \leq 0.02$, $M^1$ represents at least one element selected from the group consisting of Co, Mn and Al, and $M^2$ represents at least one element selected from the group consisting of Zr, Ti, Mg, B and W.

DETAILED DESCRIPTION OF EMBODIMENTS

Recently, the use of a non-aqueous secondary battery as a power source for a large-sized apparatus, such as an electric vehicle, is being studied. Therefore, the non-aqueous secondary battery is required not only to have high charge-discharge capacity but also to reduce a variation in the quality of the battery. When a secondary battery is used as a power source for a large-sized apparatus, the unit quantity (batch) of the positive electrode active material required for producing such a secondary battery in a unit quantity is increased. The present inventor has found that, in the production of a unit quantity of the secondary battery for use as a power source for a large-sized apparatus, a conventional technique has problems in that a significant amount of moisture is mixed into the positive electrode active material during the production of the secondary battery in the unit quantity, and in that a variation in the charge-discharge capacity is caused in the resultant secondary battery in the unit quantity. The present inventor has found that the above problems lead to a further serious problem when a lithium metal composite oxide having a high nickel ratio is used in the positive electrode active material.

The above-mentioned problems can be solved by strictly controlling the working environment in the production process for secondary battery. However, the installation of additional facilities and monitoring the working environment for achieving such strict control disadvantageously increase the production cost for the secondary battery.

In view of the above, the present disclosure has been made. An object of the present disclosure is to provide a positive electrode active material which can maintain the moisture resistance for a long term, despite using a lithium metal composite oxide having a high nickel ratio.

For attaining the above object, the present inventor has made extensive and intensive studies, and the present invention has been completed. The present inventor has found that when core particles, which are obtained by satisfactorily removing lithium-containing water-soluble impurities from a lithium metal composite oxide having a high nickel ratio, are treated with a coupling agent, a positive electrode active material using the resultant core particles can maintain the moisture resistance for a long term.

The positive electrode active material for a non-aqueous secondary battery according to an embodiment of the present disclosure includes: core particles including, as a main component, a lithium metal composite oxide represented by the following formula and containing a water-soluble lithium compound in a content of 1.0% or less in terms of a mass ratio; and a surface-treated portion obtained by treating the core particles with a coupling agent.

$$Li_xNi_yM^1{}_{1-y-z}M^2{}_zO_2$$

In the formula, x, y and z satisfy $0.90 \leq x \leq 1.50$, $0.6 \leq y \leq 1.0$ and $0 \leq z \leq 0.02$, $M^1$ represents at least one element selected from the group consisting of Co, Mn and Al, and $M^2$ represents at least one element selected from the group consisting of Zr, Ti, Mg, B and W.

Further, the method for producing a positive electrode active material for a non-aqueous secondary battery according to another embodiment of the present disclosure includes: a washing step of washing initial particles including, as a main component, a lithium metal composite oxide represented by the following formula to obtain core particles including the lithium metal composite oxide as a main component and containing a water-soluble lithium compound in a content of 1.0% or less in terms of a mass ratio; and a surface treatment step of treating the core particles with a coupling agent.

$$Li_xNi_yM^1{}_{1-y-z}M^2{}_zO_2$$

In the formula, x, y and z satisfy $0.90 \leq x \leq 1.50$, $0.6 \leq y \leq 1.0$ and $0 \leq z \leq 0.02$, $M^1$ represents at least one element selected from the group consisting of Co, Mn, and Al, and $M^2$ represents at least one element selected from the group consisting of Zr, Ti, Mg, B and W.

The positive electrode active material for a non-aqueous secondary battery according to an embodiment of the present disclosure has the above-mentioned characteristic feature, and hence can maintain the moisture resistance for a long term. Therefore, even when the unit quantity of the secondary battery produced is increased, it is possible to reduce a variation in the quality of the secondary battery.

Hereinbelow, with respect to the positive electrode active material for a non-aqueous secondary battery according to an embodiment of the present disclosure and the method for producing the same, examples of the embodiment will be described. The present embodiment is not limited to the description shown below.

The positive electrode active material for a non-aqueous secondary battery according to the present embodiment includes core particles including, as a main component, a lithium metal composite oxide having a high nickel ratio, and containing a water-soluble lithium compound in a predetermined content or less, and a specific surface-treated portion. Explanation is made below mainly on the core particles and the surface-treated portion.

1. Core Particles

The core particles include, as a main component, a lithium metal composite oxide including nickel as an essential component. The term "main component" means a component which chemically characterizes the core particles. The mass ratio of the lithium metal composite oxide to the core particles is preferably more than 50.0%, more preferably 60.0% or more, especially preferably 99.0% or more. The core particles may contain impurities inevitably mixed thereinto. Among the impurities, the below-mentioned water-soluble lithium compound is contained in a predetermined content or less. The median particle diameter of the core particles is not particularly limited, and may be about 3 to 20 µm. In the present specification, the median particle diameter of the core particles is a median particle diameter, as determined by a laser diffraction method, based on the volume distribution.

1-1. Main Component

In the main component, for fully utilizing a charge-discharge capacity which is an advantageous property of the lithium-nickel composite oxide, the ratio of nickel to the metal elements other than lithium is 60 mol % or more. Here, said ratio of nickel to the metal elements other than lithium in the lithium-nickel composite oxide is also referred to as "nickel ratio". Part of the nickel may be replaced by another metal element in a ratio of up to 40 mol %. Here, said another metal element is also referred to as "element $M^1$". As element $M^1$, cobalt, manganese, or aluminum can be selected. Part of the nickel may be replaced by further another metal element in a ratio of up to 2 mol %. Here, said further another metal element is also referred to as "element $M^2$". As element $M^2$, zirconium, titanium, magnesium, boron, or tungsten can be selected. Taking into consideration, for example, facilitating the synthesis of the oxide and the reduction of the below-mentioned water-soluble lithium compound, the nickel is preferably replaced by element $M^1$ in a ratio of from 15 to 30 mol %.

When the ratio of lithium to other metal elements, such as nickel, is high, an improvement of the output characteristics is expected, but, when the lithium ratio is too high, sintering is likely to occur upon synthesis of the oxide, making the synthesis difficult. Taking the balance between these properties into consideration, the ratio of lithium to other metal elements is from 0.90 to 1.50. A preferred range of the ratio is from 1.05 to 1.25.

From the above, the composition of the main component can be represented by the following formula.

$$Li_xNi_yM^1{}_{1-y-z}M^2{}_zO_2$$

In the formula, x, y and z satisfy $0.90 \leq x \leq 1.50$, $0.6 \leq y \leq 1.0$ and $0 \leq z \leq 0.02$, $M^1$ represents at least one element selected from the group consisting of Co, Mn and Al, and $M^2$ represents at least one element selected from the group consisting of Zr, Ti, Mg, B and W. A preferred range of x is $1.05 \leq x \leq 1.25$, and a preferred range of y is $0.7 \leq y \leq 0.85$. A range of (1-y-z) is $0 \leq 1-y-z \leq 0.40$, preferably $0.15 \leq 1-y-z \leq 0.30$.

1-2. Water-Soluble Lithium Compound

When a lithium metal composite oxide having a high nickel ratio is used as a main component of the core particles, it is likely that unreacted lithium remains in the core particles. Such remaining lithium is reacted with, for example, carbon dioxide in air to be changed to a water-soluble lithium compound, such as lithium carbonate. The water-soluble lithium compound lowers the moisture resistance of the finally obtained positive electrode active material. Further, when the lithium-nickel composite oxide as a main component and the water-soluble lithium compound coexist, the effect of the below-mentioned surface-treated portion becomes poor. Therefore, the content of the water-soluble lithium compound in the core particles is adjusted to 1.0% or less in terms of a mass ratio. A preferred content of the water-soluble lithium compound in the core particles is 0.6% or less. The content of the water-soluble lithium compound in the core particles is a value of content in terms of lithium hydroxide. The method for adjusting the content of the water-soluble lithium compound in the core particles is described later.

2. Surface-Treated Portion

The core particles are treated with a coupling agent to obtain a surface-treated portion, and therefore an intended positive electrode active material is obtained. The surface-treated portion is in a form such that a hydrophilic group of the coupling agent is chemically bonded to the surface of the core particles and a hydrophobic group of the coupling agent covers the surface of the active material particles. As a coupling agent, for example, a silane coupling agent having silicon as a central metal element, a titanium coupling agent having titanium as a central metal element, or an aluminum coupling agent having aluminum as a central metal element can be selected. Two or more types of coupling agents having different central metal elements, hydrophilic groups, or hydrophobic groups may be used in combination. With respect to the silane coupling agent, commercially available products having various combinations of hydrophilic groups, hydrophobic groups, and others are present, which conveniently offers many options according to the purpose. As a silane coupling agent, for example, trifluoropropylmethoxysilane, hexyltrimethoxysilane, 3-aminopropyltrimethoxysilane, n-propyltrimethoxysilane, decyltrimethoxysilane, or phenyltrimethoxysilane can be selected.

When the formula weight of the hydrophobic group of the coupling agent is too large, it becomes difficult to control the mass ratio of the coupling agent to the core particles, and hence care should be taken. When the formula weight of the hydrophobic group is 250 or less, there is no particular problem.

When a coupling agent having a plurality of hydrophilic groups is used, the moisture resistance advantageously tends to be higher. The reason for this is presumed that condensation is caused between the hydrophilic groups within the coupling agent.

When the mass ratio of the coupling agent to the core particles is 2.0% or less, it is preferable since desorption and insertion of lithium ions caused between the positive electrode active material and an electrolytic solution or the like are not inhibited. When the mass ratio of the coupling agent to the core particles is from 0.1 to 1.0%, both high moisture resistance and other various properties can be more advantageously achieved. The amount of the coupling agent for the mass ratio is the amount of the coupling agent used in treating the core particles.

Next, as a preferred example of a method for obtaining the positive electrode active material for a non-aqueous secondary battery according to the present embodiment, the method for producing a positive electrode active material for a non-aqueous secondary battery according to the present embodiment is described below. The method for producing a positive electrode active material for a non-aqueous secondary battery according to the present embodiment includes: a washing step of washing initial particles including, as a main component, a lithium metal composite oxide having a high nickel ratio to obtain core particles including the lithium metal composite oxide having a high nickel ratio as a main component and containing a water-soluble lithium compound in a predetermined content or less; and a surface treatment step of treating the core particles with a coupling agent. Explanation is made below mainly on the washing step and the surface treatment step.

1. Providing Core Particles

Using an appropriate known method, initial particles including, as a main component, a lithium metal composite oxide represented by the following formula are obtained.

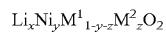

In the formula, x, y and z satisfy $0.90 \leq x \leq 1.50$, $0.6 \leq y \leq 1.0$ and $0 \leq z \leq 0.02$, $M^1$ represents at least one element selected from the group consisting of Co, Mn and Al, and $M^2$ represents at least one element selected from the group consisting of Zr, Ti, Mg, B and W. The obtained initial particles generally contain a water-soluble lithium compound in a content of about 1.0 to 5.0% in terms of a mass ratio. For this reason, in the washing step described below, the content of the water-soluble lithium compound in the particles is adjusted to a predetermined content or less.

2. Washing Step

In the washing step, the initial particles are washed using a dispersing medium, which is capable of dissolving therein a water-soluble lithium compound, to obtain core particles including the lithium metal composite oxide as a main component and containing a water-soluble lithium compound in a content of 1.0% or less in terms of a mass ratio. As a dispersing medium to be used in the washing step, for example, pure water or an acid can be selected. A specific washing method can be appropriately selected according to, for example, the type of the dispersing medium, the mass ratio of the liquid phase and the initial particles in the dispersing medium, and the apparatus used in the washing step. Completion of the washing step can be confirmed by using as a yardstick, for example, the electric conductivity of the liquid phase of the dispersing medium. In the case where the dispersing medium is pure water, when the electric conductivity of the liquid phase obtained after stirring for a predetermined period of time is 0.5 mS/cm or less, it can be considered that intended core particles are obtained.

3. Surface Treatment Step

In the surface treatment step, using an appropriate known method, the core particles are treated with a coupling agent. In this step, a desired surface-treated portion is formed on the surface of the core particles, and therefore an intended positive electrode active material for a non-aqueous secondary battery is obtained. The method for treatment is not particularly limited, but it is preferred that a coupling agent solution is dropwise added or sprayed to the core particles being flowed or stirred because the solvent vaporizes from the coupling agent solution almost simultaneously with the formation of the surface-treated portion, making it possible to prevent an unexpected change of the powder characteristics. The amounts of the core particles and the coupling agent in the surface treatment step are as mentioned above in connection with the positive electrode active material.

For promoting the formation of the surface-treated portion, the surface treatment step may include a step of subjecting to heat treatment the coated particles which are the core particles coated with a coupling agent. The heat treatment temperature is not particularly limited, but is preferably 100 to 300° C., more preferably 150 to 200° C. The heat treatment time is not particularly limited, but is preferably 10 minutes to 20 hours, more preferably 1 to 15 hours.

4. After-Treatment

The obtained positive electrode active material may be subjected to treatment, such as dry sieving, drying or classification, according to the purpose.

Positive Electrode

The positive electrode active material is mixed with, for example, a known conductive material and binder to prepare a positive electrode composition, and the resultant composition is, for example, applied to a known positive electrode current collector to form a positive electrode active material layer, and therefore a positive electrode for a non-aqueous secondary battery is obtained. Examples of conductive materials include natural graphite, artificial graphite, and acetylene black. Examples of binders include polyvinylidene fluoride, polytetrafluoroethylene, and a polyamide acrylic resin. Examples of positive electrode current collectors include aluminum, nickel, and stainless steel.

Non-Aqueous Secondary Battery

A non-aqueous secondary battery including a positive electrode obtained using the positive electrode active material can be obtained by, for example, using the above-described positive electrode for a non-aqueous secondary battery, a known negative electrode for a non-aqueous secondary battery, a known non-aqueous electrolytic solution, a known solid electrolyte, and a known separator. The negative electrode, non-aqueous electrolytic solution, solid electrolyte, separator, or the like in the non-aqueous secondary battery are not particularly limited, and include those for non-aqueous secondary battery described in, for example, JP 2002-075367A, JP 2011-146390A, JP 2006-12433A and JP2014-170656A.

EXAMPLES

Hereinbelow, the present embodiment will be described in more detail with reference to the following Examples. The ratio indicates an amount of substance ratio (molar ratio) unless otherwise specified.

Example 1

A metal composite hydroxide of Ni:Co:Mn=8:1:1 was obtained by using a coprecipitation method. The obtained metal composite hydroxide, lithium hydroxide, and zirconium(IV) oxide were mixed so that Li:(Ni+Co+Mn):Zr becomes 1.04:1:0.005 to obtain a mixed raw material. The obtained mixed raw material was calcined in an atmosphere of air at 760° C. for 19 hours to obtain a calcined material. The obtained calcined material was ground and then dry-sieved to obtain initial particles including, as a main component, a lithium metal composite oxide represented by the compositional formula: $Li_{1.04}Ni_{0.8}Co_{0.1}Mn_{0.1}Zr_{0.005}O_2$.

The obtained initial particles were transferred to a washing container, and pure water in a mass ten times that of the initial particles was poured into the washing container. After pouring the water, the initial particles were allowed to stand until the border between the solid phase and the liquid phase became definite. After allowing the particles to stand, an electric conductivity of the liquid phase was measured, and decantation was performed. A series of the above operations of pouring pure water, allowing the particles to stand, and decantation was repeated until the electric conductivity of the liquid phase became 0.5 mS/cm or less. After the final decantation, the solid phase was dehydrated, and further dried at 250° C. for 10 hours to obtain core particles.

The obtained core particles were placed in a high-speed shearing type mixer, and stirring at 500 rpm was started. Separately, 42.6 parts by mass of trifluoropropyltrimethoxysilane, 38.3 parts by mass of ethanol, and 19.1 parts by mass of pure water were mixed together to prepare a coupling agent solution. The resultant coupling agent solution was dropwise added to the core particles until the mass of the trifluoropropyltrimethoxysilane added became 2.0% of the mass of the core particles and then coated particles are obtained. The obtained coated particles were subjected to heat treatment at a heat treatment temperature of 250° C. for 10 hours, and passed through dry sieving with a sieve opening of 75 μm to obtain an intended positive electrode active material.

Example 2

An intended positive electrode active material was obtained in a similar manner as in Example 1, except that the coupling agent solution was dropwise added to the core particles until the mass of the trifluoropropyltrimethoxysilane added became 0.6% of the mass of the core particles.

Example 3

An intended positive electrode active material was obtained in a similar manner as in Example 2, except that n-propyltrimethoxysilane was used instead of the trifluoropropyltrimethoxysilane.

Example 4

An intended positive electrode active material was obtained in a similar manner as in Example 2, except that decyltrimethoxysilane was used instead of the trifluoropropyltrimethoxysilane.

Example 5

An intended positive electrode active material was obtained in a similar manner as in Example 2, except that phenyltrimethoxysilane was used instead of the trifluoropropyltrimethoxysilane.

Example 6

A metal composite hydroxide of Ni:Co:Mn=7:2:1 was obtained by using a coprecipitation method. The obtained metal composite hydroxide and lithium hydroxide were mixed so that Li:(Ni+Co+Mn) becomes 1.01:1 to obtain a mixed raw material. The obtained mixed raw material was calcined in an atmosphere of air at 760° C. for 19 hours to obtain a calcined material. The obtained calcined material was ground and then dry-sieved to obtain initial particles including, as a main component, a lithium metal composite oxide represented by the compositional formula: $Li_{1.01}Ni_{0.7}Co_{0.2}Mn_{0.1}O_2$. An intended positive electrode active material was obtained in a similar manner as in Example 2, except that the obtained initial particles were used.

Comparative Example 1

The initial particles in Example 1 were used as a positive electrode active material in Comparative Example 1.

Comparative Example 2

The initial particles in Example 1 were placed in a high-speed shearing type mixer, and stirring at 500 rpm was started. Separately, 42.6 parts by mass of trifluoropropyltrimethoxysilane, 38.3 parts by mass of ethanol, and 19.1 parts by mass of pure water were mixed together to prepare a coupling agent solution. The resultant coupling agent solution was dropwise added to the core particles until the mass of the trifluoropropyltrimethoxysilane added became 0.6% of the mass of the core particles and then coated particles are obtained. The obtained coated particles were subjected to heat treatment at a heat treatment temperature of 250° C. for 10 hours, and passed through dry sieving with a sieve opening of 75 μm to obtain an intended positive electrode active material.

Comparative Example 3

The core particles in Example 1 were used as a positive electrode active material in Comparative Example 3.

Comparative Example 4

The initial particles in Example 6 were placed in a high-speed shearing type mixer, and stirring at 500 rpm was started. Separately, 42.6 parts by mass of trifluoropropyltrimethoxysilane, 38.3 parts by mass of ethanol, and 19.1 parts by mass of pure water were mixed together to prepare a coupling agent solution. The resultant coupling agent solution was dropwise added to the core particles until the mass of the trifluoropropyltrimethoxysilane added became 0.6% of the mass of the core particles, and then coated particles are obtained. The obtained coated particles were subjected to heat treatment at a heat treatment temperature of 250° C. for 10 hours, and passed through dry sieving with a sieve opening of 75 μm to obtain an intended positive electrode active material.

Water-Soluble Lithium Compound

In Examples 1 to 6 and Comparative Examples 1 to 4, when the washing step was performed, the amount of the water-soluble lithium compound contained in the core particles was measured by a titration method, and, when the washing step was not performed, the amount of the water-soluble lithium compound contained in the initial particles was measured by a titration method. Specifically, 10 g of the core particles or initial particles were dispersed in 50 mL of pure water and stirred for 60 minutes, and then the resultant filtrate was subjected to titration using sulfuric acid. As an indicator for the end point of titration, a Bromophenol Blue (BPB) solution was used. From the molar amount of the sulfuric acid used, the amount of the water-soluble lithium compound in terms of lithium hydroxide was determined in a unit of wt %.

Composition of the Initial Particles

The composition of the initial particles was determined by an inductively coupled plasma (ICP) analysis.

Evaluation of the Moisture Resistance

With respect to each of the positive electrode active materials in Examples 1 to 6 and Comparative Examples 1 to 4, the moisture resistance was evaluated by the following method.

The obtained positive electrode active material was dried at 250° C. for 8 hours. Immediately after dried, a water amount W(1) in the positive electrode active material was measured by a Karl Fischer method. After the measurement, the positive electrode active material was allowed to stand in an atmosphere at a temperature of 25° C. and at a relative humidity of 74% for 24 hours. After allowed to stand, a water amount W(2) in the positive electrode active material was further measured. A change between the measurement values of the positive electrode active material before and after allowed to stand was determined as a moisture absorption $\Delta W(=W(2)-W(1))$.

Evaluation of the Charge-Discharge Characteristics

Using the positive electrode active materials in Examples 1 to 6 and Comparative Examples 1 to 4, non-aqueous electrolyte secondary batteries were individually prepared in accordance with the procedure described below, and a charge-discharge capacity of each secondary battery was measured. It is noted that also when an all-solid secondary battery is prepared as a non-aqueous secondary battery and evaluated, a similar tendency is observed.

1. Preparation of a Positive Electrode

90 Parts by weight of the positive electrode active material, 2.5 parts by weight of acetylene black, 2.5 parts by weight of graphite carbon, and 5 parts by weight of PVDF (polyvinylidene fluoride) were dispersed and dissolved in NMP (N-methyl-2-pyrrolidone) to prepare a positive electrode slurry. The obtained positive electrode slurry was applied to a current collector included of an aluminum foil and dried to obtain a positive electrode.

2. Preparation of a Negative Electrode 97.5 Parts by weight of artificial graphite, 1.5 part by weight of CMC (carboxymethyl cellulose), and 1.0 part by weight of an SBR (styrene-butadiene rubber) were dispersed in water to prepare a negative electrode slurry. The obtained negative electrode slurry was applied to a copper foil and dried, and further subjected to compression molding to obtain a negative electrode.

3. Preparation of a Non-Aqueous Electrolytic Solution

EC (ethylene carbonate) and MEC (methylethyl carbonate) were mixed in a volume ratio of 3:7 to obtain a solvent. Lithium hexafluorophosphate ($LiPF_6$) was dissolved in the resultant mixed solvent so that the lithium hexafluorophosphate concentration became 1 mol/L to obtain a non-aqueous electrolytic solution.

4. Assembly of a Non-Aqueous Electrolyte Secondary Battery

Lead electrodes were respectively attached to the current collectors of the above-prepared positive electrode and negative electrode, followed by vacuum drying at 120° C. Then, a separator composed of porous polyethylene was placed between the positive electrode and the negative electrode, and the resultant material was contained in a laminate pack in a bag form. After that, moisture adsorbed to each member is removed by vacuum drying at 60° C. After the vacuum drying, the above-prepared non-aqueous electrolytic solution was injected into the laminate pack, and the laminate pack was sealed to obtain a non-aqueous electrolyte secondary battery of a lamination type. The obtained battery was used as a battery for evaluation.

5. Aging

With respect to the obtained battery for evaluation, a series of a constant-voltage constant-current charging operation at a charge voltage of 4.2 V and at a charge current of 0.1 C and a constant-current discharging operation at a discharge voltage of 2.75 V and at a discharge current of 0.2 C was repeated twice. Here, 1 C means a current at which discharging is completed in 1 hour. Then, a series of charging operation and discharging operations as mentioned above was performed one time, except that the charge current was changed to 0.2 C, thereby allowing the non-aqueous electrolytic solution to permeate sufficiently into the positive and negative electrodes.

6. Measurement 1 of a Charge-Discharge Capacity

After the aging, constant-voltage constant-current charging was performed at a charge voltage of 4.3 V and at a charge current of 0.2 C, and a charge capacity $Ec(1)$ of the resultant battery was measured. After the measurement, constant-current discharging was performed at a discharge voltage of 2.75 V and at a discharge current of 0.2 C, and a discharge capacity $Ed(1)$ of the resultant battery was measured.

7. Measurement 2 of a Charge-Discharge Capacity

Using each of the positive electrode active materials in Examples and Comparative Examples, a positive electrode was prepared, and then the positive electrode was allowed to stand in an atmosphere at a temperature of 25° C. and at a relative humidity of 74% for 120 hours to obtain an after-standing positive electrode. Using the individual after-standing positive electrodes instead of the above-mentioned positive electrodes, batteries were prepared, and a charge capacity $Ec(2)$ and a discharge capacity $Ed(2)$ of each battery were measured. Further, a charge capacity change $\Delta Ec$ ($\equiv Ec(2)-Ec(1)$) and a discharge capacity change $\Delta Ed$ ($\equiv Ed(2)-Ed(1)$) caused due to the timing of the preparation of the positive electrode were determined by calculation.

With respect to Examples 1 to 6 and Comparative Examples 1 to 3, the preparation conditions are shown in Table 1, and the moisture resistance of the positive electrode active materials and the charge-discharge characteristics of the non-aqueous electrolyte secondary batteries are shown in Table 2.

TABLE 1

| | Initial particles* | Washing step | Water-soluble lithium compound/wt %** | Coupling agent Type | Amount/wt % |
|---|---|---|---|---|---|
| Example 1 | $Li_{1.04}Ni_{0.8}Co_{0.1}Mn_{0.1}Zr_{0.005}O_2$ | Done | 0.07 | Trifluoropropyltrimethoxysilane | 2.0 |
| Example 2 | | | 0.16 | | 0.6 |
| Example 3 | | | 0.27 | n-Propyltrimethoxysilane | 0.6 |
| Example 4 | | | 0.17 | Decyltrimethoxysilane | 0.6 |
| Example 5 | | | 0.21 | Phenyltrimethoxysilane | 0.6 |
| Example 6 | $Li_{1.01}Ni_{0.7}Co_{0.2}Mn_{0.1}O_2$ | | 0.26 | | 0.6 |
| Comparative example 1 | $Li_{1.04}Ni_{0.8}Co_{0.1}Mn_{0.1}Zr_{0.005}O_2$ | None | 1.97 | — | — |
| Comparative example 2 | | | 1.69 | Trifluoropropylmethoxysilane | 0.6 |
| Comparative example 3 | | Done | 0.54 | — | — |
| Comparative Example 4 | $Li_{1.01}Ni_{0.7}Co_{0.2}Mn_{0.1}O_2$ | | 0.26 | | |

*Composition of main component
**Based on the core particles when the washing step is done, and based on the initial particles when the washing step is not done.

TABLE 2

| | $W(1)$/ppm | $W(2)$/ppm | $\Delta W$/ppm | $Ec(1)$/mAhg$^{-1}$ | $Ec(2)$/mAhg$^{-1}$ | $\Delta Ec$/mAhg$^{-1}$ | $Ed(1)$/mAhg$^{-1}$ | $Ed(2)$/mAhg$^{-1}$ | $\Delta Ed$/mAhg$^{-1}$ |
|---|---|---|---|---|---|---|---|---|---|
| Example 1 | 555 | 937 | +382 | 222 | 220 | −2 | 188 | 185 | −3 |
| Example 2 | 310 | 571 | +261 | 224 | 224 | ±0 | 197 | 194 | −3 |
| Example 3 | 540 | 1162 | +622 | 225 | 224 | −1 | 194 | 191 | −3 |
| Example 4 | 582 | 1084 | +502 | 226 | 226 | ±0 | 188 | 189 | +1 |
| Example 5 | 374 | 991 | +616 | 227 | 224 | −3 | 196 | 193 | −3 |
| Example 6 | 345 | 530 | +185 | 210 | 210 | ±0 | 178 | 175 | −3 |
| Comparative example 1 | 147 | 2485 | +2338 | 229 | 219 | −10 | 200 | 197 | −3 |
| Comparative example 2 | 260 | 1879 | +1619 | 223 | 221 | −2 | 198 | 191 | −6 |
| Comparative example 3 | 641 | 2497 | +1856 | 228 | 217 | −11 | 202 | 184 | −18 |
| Comparative example 4 | 452 | 1369 | +917 | 212 | 209 | +3 | 181 | 174 | −7 |

As is apparent from Tables 1 and 2, the positive electrode active materials in Examples 1 to 6, which are obtained by the method including both the washing step and the surface treatment step, have a small moisture absorption ΔW such that the moisture resistance is excellent, and the non-aqueous electrolyte secondary batteries using these positive electrode active materials have small absolute values of both ΔEc and ΔEd, which indicates that the quality of the secondary battery is stable irrespective of the timing of the production of the secondary battery. Further, it is apparent that the positive electrode active materials in Comparative Examples 1 to 4, which are obtained by the method in which at least one of the washing step and the surface treatment step is omitted, have a large moisture absorption ΔW such that the moisture resistance is poor, and that the non-aqueous electrolyte secondary batteries using these positive electrode active materials largely vary in the quality depending on the timing of the production of the secondary battery. Particularly, with respect to the positive electrode active material in Comparative Example 2, although the surface treatment step is performed, a variation in the quality of the obtained secondary battery is recognized. The reason for this is presumed that the presence of the water-soluble lithium compound inhibits formation of the surface-treated portion or inhibits the function of the formed surface-treated portion. Furthermore, from a comparison of Example 5 and Comparative Example 3 with Example 6 and Comparative Example 4, it is apparent that when the nickel ratio in the initial particles is higher, a variation in the quality becomes larger, and the effect of the washing step and surface treatment step is more remarkable.

The positive electrode active material for a non-aqueous secondary battery of the present disclosure can be advantageously used as a positive electrode active material for a battery which is a power source for a large-sized apparatus, such as an electric vehicle.

As described above, it should be obvious that various other embodiments are possible without departing the spirit and scope of the present invention. Accordingly, the scope and spirit of the present invention should be limited only by the following claims.

All publications, patent applications, and technical standards mentioned in this specification are herein incorporated by reference to the same extent as if each individual publication, patent application, or technical standard was specifically and individually indicated to be incorporated by reference.

What is claimed is:

1. A positive electrode active material for a non-aqueous secondary battery comprising:
    core particles comprising, as a main component, a lithium metal composite oxide represented by the following formula:

$Li_xNi_yM^1{}_{1-y-z}M^2{}_zO_2$ wherein 0.90≤x≤1.50, 0.6≤y≤1.0, 0≤z≤0.02, 0.15≤1-y-z≤0.30, $M^1$ includes Co and Mn, and $M^2$ includes Zr, and
    where the core particles comprise a water-soluble lithium compound in an amount greater than or equal to 0.07 wt % and less than or equal to 0.27 wt % based on the weight of the core particles; and
    a surface-treated portion obtained by treating the core particles with a coupling agent comprising at least one of trifluoropropylmethoxysilane, n-propyltrimethoxysilane, hexyltrimethoxylsilane, decyltrimethoxysilane, or phenyltrimethoxysilane.

2. The positive electrode active material according to claim 1, wherein the mass ratio of the coupling agent to the core particles is 2.0% or less.

3. The positive electrode active material according to claim 1, wherein $M^2$ further includes at least one element selected from the group consisting of Ti, Mg, B and W.

4. A method for producing a positive electrode active material for a non-aqueous secondary battery, the method comprising:
    providing initial particles comprising, as a main component, a lithium metal composite oxide represented by the following formula:

$Li_xNi_yM^1{}_{1-y-z}M^2{}_zO_2$ wherein 0.90≤x≤1.50, 0.6≤y≤1.0, 0≤z≤0.02, 0.15≤1-y-z≤0.30, $M^1$ includes Co and Mn, and $M^2$ includes Zr;
    washing the initial particles to obtain core particles comprising the lithium metal composite oxide as a main component and comprising a water-soluble lithium compound in an amount greater than or equal to 0.07 wt % and less than or equal to 0.27 wt % based on the weight of the core particles; and
    treating the core particles with a coupling agent comprising at least one of trifluoropropylmethoxysilane, n-propyltrimethoxysilane, hexyltrimethoxylsilane, decyltrimethoxysilane, or phenyltrimethoxysilane.

5. The method according to claim 4, wherein $M^2$ further includes at least one element selected from the group consisting of Ti, Mg, B and W.

6. The method according to claim 4, wherein the treating the core particles with the coupling agent comprises heat treating the core particles that have been coated with the coupling agent at a temperature in a range of 150 to 300° C.

7. A positive electrode active material for a non-aqueous secondary battery comprising:
    core particles comprising, as a main component, a lithium metal composite oxide represented by the following formula:

$Li_xNi_yM^1{}_{1-y-z}M^2{}_zO_2$ wherein 0.90≤x≤1.50, 0.6≤y≤1.0, 0≤z≤0.02, 0.15≤1-y-z≤0.30, $M^1$ includes Co and Mn, and $M^2$ includes Zr, and
    where the core particles comprise a water-soluble lithium compound in an amount greater than or equal to 0.07 wt % and less than or equal to 0.27 wt % based on the weight of the core particles; and
    a surface-treated portion obtained by treating the core particles with a coupling agent comprising hydrophilic groups that chemically bond to surfaces of the core particles to form the surface-treated portion.

8. The positive electrode active material according to claim 7, wherein the mass ratio of the coupling agent to the core particles is 2.0% or less.

9. The positive electrode active material according to claim 8, wherein the coupling agent is a silane coupling agent.

10. The positive electrode active material according to claim 7, wherein the coupling agent is a silane coupling agent.

11. The positive electrode active material according to claim 7, wherein $M^2$ further includes at least one element selected from the group consisting of Ti, Mg, B and W.

12. The positive electrode active material according to claim 7, wherein the coupling agent further comprises hydrophobic groups.

13. A method for producing a positive electrode active material for a non-aqueous secondary battery, the method comprising:
  providing initial particles comprising, as a main component, a lithium metal composite oxide represented by the following formula:

$Li_xNi_yM^1_{1-y-z}M^2_zO_2$ wherein $0.90 \leq x \leq 1.50$, $0.6 \leq y \leq 1.0$, $0 \leq z \leq 0.02$, $0.15 \leq 1-y-z \leq 0.30$, $M^1$ includes Co and Mn, and $M^2$ includes Zr;
  washing the initial particles to obtain core particles comprising the lithium metal composite oxide as a main component and comprising a water-soluble lithium compound in an amount greater than or equal to 0.07 wt % and less than or equal to 0.27 wt % based on the weight of the core particles; and
  treating the core particles with a coupling agent comprising hydrophilic groups that chemically bond to surfaces of the core particles to form the surface-treated portion.

14. The method according to claim 13, wherein $M^2$ further includes at least one element selected from the group consisting of Ti, Mg, B and W.

15. The method according to claim 13, wherein the treating the core particles with the coupling agent comprises heat treating the core particles that have been coated with the coupling agent at a temperature in a range of 150 to 300° C.

16. The method according to claim 13, wherein the coupling agent further comprises hydrophobic groups.

* * * * *

UNITED STATES PATENT AND TRADEMARK OFFICE
CERTIFICATE OF CORRECTION

PATENT NO. : 10,516,159 B2
APPLICATION NO. : 14/723306
DATED : December 24, 2019
INVENTOR(S) : Tatsuya Yokoyama It is certified that error appears in the above-identified patent and that said Letters Patent is hereby corrected as shown below:

In the Claims

Claim 1, Column 13, Line 56:
Please delete:
"$0 \leq z \leq 0.02$,"
Please replace with:
"$0 < z \leq 0.02$,"

Claim 4, Column 14, Line 15:
Please delete:
"$0 \leq z \leq 0.02$,"
Please replace with:
"$0 < z \leq 0.02$,"

Claim 7, Column 14, Line 42:
Please delete:
"$0 \leq z \leq 0.02$,"
Please replace with:
"$0 < z \leq 0.02$,"

Claim 13, Column 15, Line 8:
Please delete:
"$0 \leq z \leq 0.02$,"
Please replace with:
"$0 < z \leq 0.02$,"

Signed and Sealed this
Thirty-first Day of March, 2020

Andrei Iancu
*Director of the United States Patent and Trademark Office*